United States Patent [19]

Impink, Jr. et al.

[11] Patent Number: 4,774,049

[45] Date of Patent: Sep. 27, 1988

[54] TWO AND THREE DIMENSIONAL CORE POWER DISTRIBUTION MONITOR AND DISPLAY

[75] Inventors: Albert J. Impink, Jr., Murrysville; Louis R. Grobmyer, North Huntingdon, both of Pa.

[73] Assignee: Westinghouse Electric Corp., Pittsburgh, Pa.

[21] Appl. No.: 850,196

[22] Filed: Apr. 10, 1986

[51] Int. Cl.$^4$ .............................................. G21C 17/00
[52] U.S. Cl. .................... 376/245; 376/247; 376/259
[58] Field of Search ............... 376/245, 247, 259, 217

[56] References Cited

U.S. PATENT DOCUMENTS

| | | | |
|---|---|---|---|
| 3,810,138 | 5/1974 | Thompson et al. | 376/247 |
| 4,400,343 | 8/1983 | Izumi et al. | 376/217 |
| 4,427,620 | 1/1984 | Cook | 376/259 |
| 4,552,718 | 11/1985 | Impink, Jr. et al. | 376/245 |
| 4,608,223 | 8/1986 | Twilley, Jr. | 376/259 |
| 4,627,954 | 12/1986 | LeRoy et al. | 376/216 |
| 4,650,633 | 3/1987 | Youngborg | 376/247 |
| 4,654,186 | 3/1987 | LeRoy et al. | 376/216 |

FOREIGN PATENT DOCUMENTS 0122172 10/1984 European Pat. Off. .
2307341 11/1976 France .

OTHER PUBLICATIONS

Robert L. Harder, *Interpolation Using Surface Splines*, Feb. 1972, pp. 189-191, Journal of Aircraft.

*Primary Examiner*—Salvatore Cangialosi
*Attorney, Agent, or Firm*—D. C. Abeles

[57] ABSTRACT

A method and apparatus for monitoring and generating on-line, real time displays of two and three dimensional nuclear reactor core power distributions and off-line, periodically updated summaries of three dimensional nuclear reactor core power and burnup distributions is disclosed. The method and apparatus makes use of information obtained from inlet sensors and core-exit thermocouples to produce enthalpy rise values. Flux measurements are combined with enthalpy to produce power values. In one aspect of the invention, deviations from reference values are classified and displayed on a two-dimensional color graphics terminal where the various classifications are displayed according to a color code which enables a rapid and convenient method of analysis of the dynamics of the reactor operation.

34 Claims, 7 Drawing Sheets

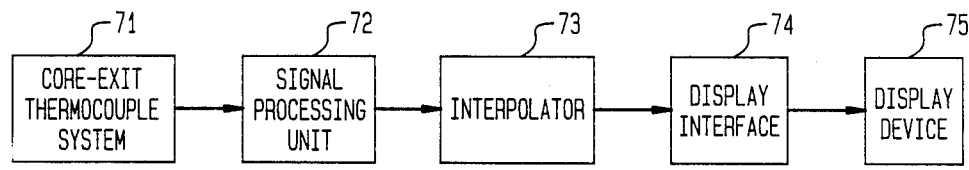
FIG. 4
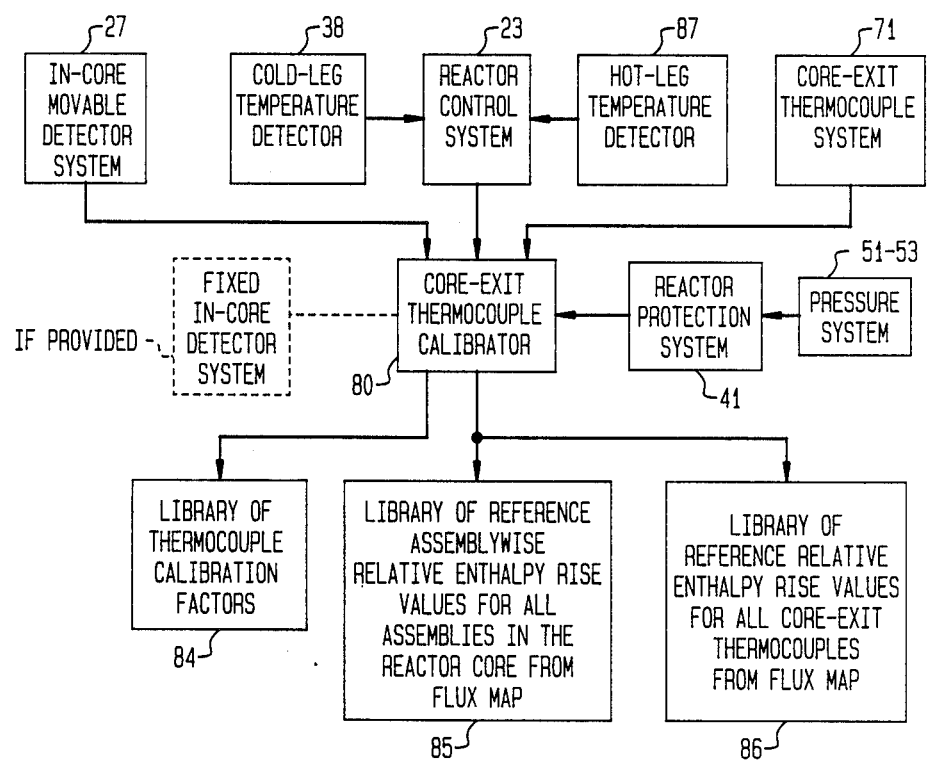
FIG. 5
FIG. 7
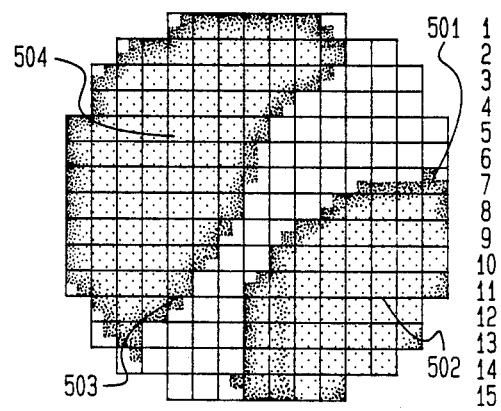

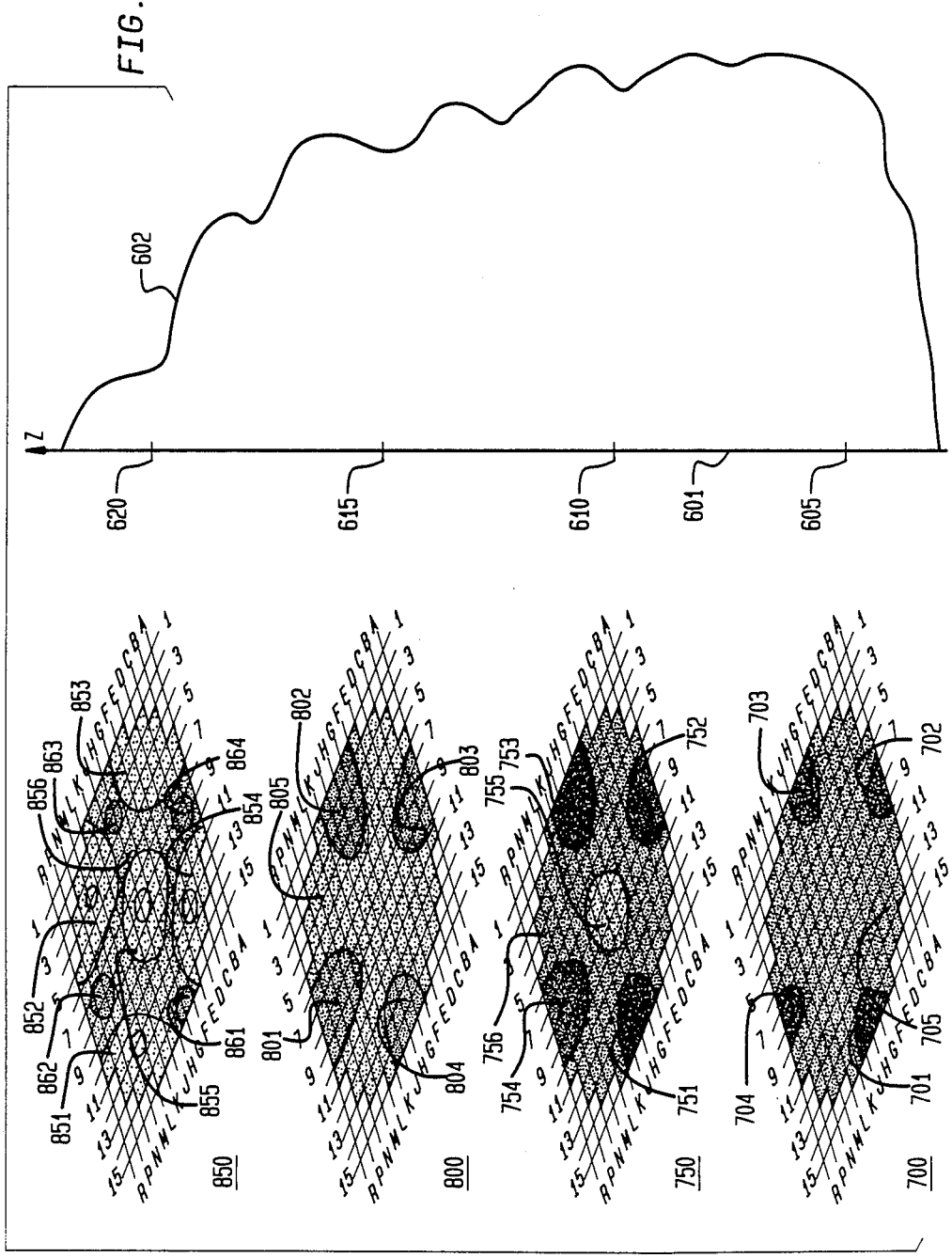

TWO AND THREE DIMENSIONAL CORE POWER DISTRIBUTION MONITOR AND DISPLAY

BACKGROUND OF THE INVENTION

1. Field of the Invention

This invention relates in general to apparatus and a method for monitoring a system operation and more particularly to such apparatus and method for monitoring and visually displaying the distributions of various physical quantities occurring within the core of a nuclear power reactor.

2. Description of the Prior Art

The controlled release of large amounts of energy through nuclear fission is now quite well known. In general, a fissionable atom such as $U^{233}$, $U^{235}$, or $PU^{239}$ absorbs a neutron in its nucleus and undergoes a nuclear disintegration. This produces on the average, two fission products of lower atomic weight and great kinetic energy, several fission neutrons, also of high energy, and fission gamma rays.

The kinetic energy of the fission products is quickly dissipated as heat in the nuclear fuel. If, concurrent with this heat generation, there is at least one neutron remaining which induces a subsequent fission, the fission reaction becomes self-sustaining and the heat generation is continuous. The heat is removed by passing a coolant through heat exchange relationship with the fuel. The reaction may be continued as long as sufficient fissionable material exists in the fuel to override the effects of fission products and other neutron absorbers which may also be present and of neutron leakage from the active region of the core.

In order to maintain such fission reactions at a rate sufficient to generate useful quantities of thermal energy, nuclear reactors are presently being designed, constructed and operated in which the fissionable material or nuclear fuel is contained in fuel elements which may have various shapes, such as plates, tubes or rods. These fuel elements are usually provided on their external surfaces with a corrosion resistant, non-reactive cladding which contains no fissionable material. The fuel elements are grouped together at fixed distances from each other in a coolant flow channel or region as a fuel assembly, and a sufficient number of fuel assemblies are arranged in a spaced array to form the nuclear reactor core capable of the self-sustained fission reaction referred to above. The core is usually enclosed within a reactor vessel.

Commonly, in pressurized water reactors, a neutron absorbing element is included within the cooling medium (which also functions as a moderator) in controlled variable concentrations to modify the reactivity, and thus the rate of heat generation within the core, when required. In addition, control rods are interspersed among the fuel assemblies, longitudinally movable axially within the core, to control the core's reactivity and thus its power output.

Control of the nuclear power distribuion within the core is a primary consideration in nuclear reactor operation. A mal-distribution may be detected by analysis of data from in-core and/or ex-core instrumentation. One conventional technique for monitoring the core power distribution involves the monitoring of the neutron flux distribution or the fission gamma ray distribution at a large number of locations within the core with the aid of fixed in-core detectors. While this approach is reliable and effective in satisfying its intended purpose, it tends to be relatively expensive to implement and so it is not universally followed. The alternative technique relies in the main on the use of a small number of sets of comparatively inexpensive ex-core neutron detectors arranged around the outside of the reactor vessel. In pressurized water reactor (PWR) installations in which this latter, alternative approach is used to insure the safety of reactor operations, an in-core instrumentation system that relies on periodically passing small neutron detectors through a number of instrumentation thimbles that are expressly provided for that purpose in the core is commonly utilized. This system is used on a periodic basis, normally about once each full power month, to collect information on which recalibration of the fixed ex-core system is based and to provide detailed reference measured power distribution information for verification of compliance with the plant Technical Specifications that regulate operation. One compromise between these two basic approaches involves the installation in the reactor of a few strings of fixed in-core neutron or gamma ray detectors. Virtually all of the commercial PWR units that rely primarily on ex-core neutron detectors for continuous power distribution monitoring have provisions for the installation of up to eight strings of fixed in-core gamma ray detectors in preselected locations. Installation of these strings of in-core detectors in the preselected locations does not inhibit operation of the movable in-core detector system and so can be accomplished at modest expense and inconvenience. Within the scope of this disclosure, the use of exclusively ex-core neutron detectors and of a few strings of fixed in-core detectors is considered synonomous: both are to be distinguished from the use of large numbers of strings of fixed in-core detectors.

The methodologies both for ex-core neutron detector recalibration and for synthesis of a detailed three dimensional core power distribution from movable detector traces are well known in the art and are in common use. Since the in-core movable detector system is actually used for core power distribution monitoring only infrequently, and usually only under reference, steady state operating conditions, the detail to which the core power distribution can be known during much of the plant operating time, when only the ex-core neutron detectors are in active service, is quite limited and so this approach carries with it certain penalties.

Some drawbacks of using only either ex-core neutron detectors or a few strings of fixed in-core detectors for power distribution monitoring with only relatively infrequent periodic reinforcement by the in-core movable detector system, include:

a high reliance on necessarily conservative, analytically based estimates of the severity of possible power peaking in the interior of the core which translates immediately into operational constraints and, in extreme cases, into compulsory power derating of the unit, with severe economic penalties.

the lack of an on-line monitor for radial or three dimensional power distribution which necessarily introduces uncertainty into the estimates of the burnup accumulated by each fuel assembly in the core especially if there is extensive control rod insertion. Burnup estimation errors can lead to unexpected power peaking in reload fuel cycles. The consideration is more important if load follow is performed routinely since it leads to more control rod movement and deeper insertion of the rods into the core, than base load operation at high power (The sequence of changes in reactor power output which is required to accommodate demand driven changes in electrical output of an electrical generating plant is commonly referred to as load follow).

the movable in-core system is a complex mechanical one which is subject to wear induced failures or malfunctions of its components. While it can be called upon to perform many duties related to power distribution monitoring, such increased usage is at a risk of increased system unreliability and of sharply increased maintenance requirements.

In present practice, thermocouples are installed at or just above the outlet nozzles of a fraction of the fuel assemblies in most commercial pressurized water nuclear power reactors. Typical reactor cores generally consist of from approximately one hundred to more than two hundred assemblies and the thermocouples are usually installed at approximately one out of four fuel assembly locations.

In the past, little use has been made of the information available from the core-exit thermocouples. Typically, the on-line plant process computer periodically samples the thermocouple voltages, converts the electrical samples into digital values in convenient engineering units, °F. or °C., and displays the results in the form of a core coolant outlet temperature map generated on a line printer. On request, the plant computer also converts the core coolant outlet temperature values at the measured locations to equivalent $F_{\Delta H}$ values, i.e. the relative enthalpy rises, at those locations and displays the results in map form on the line printer. In addition the plant computer also provides a crude measure of quadrant power tilting by comparing $F_{\Delta H}$ values at symmetric thermocouple locations.

In the event that a plant operator observes an apparent core power distribution anomaly as indicated, for example, by quadrant power tilt from the ex-core power range neutron detectors or by dissimilar coolant loop temperature rise values, he may review recent thermocouple maps to identify changes in the readings of certain thermocouples which would confirm the existence, and identify the possible cause, of the power distribution anomaly. However, in practice, the information available from the core-exit thermocouple system is virtually never used as a primary diagnostic means and is not used in actually formulating estimates of the current core power distribution.

Thus, a need exists for a method and apparatus for monitoring and displaying the information available from the core-exit thermocouple system and for incorporating that information with the information that is derivable from the ex-core neutron detector system or from a few-string fixed in-core detector system in order to eliminate the drawbacks noted above that exist in current core monitoring systems that are not based on the availability of a large number of fixed in-core nuclear detectors. Satisfaction of that need will enhance both the safety-related and commercial aspects of PWR operation.

SUMMARY OF THE INVENTION

In order to overcome the deficiencies of the prior art, this invention provides, in general, a monitoring sensor system for evaluating, combining and displaying parameters monitored by a plurality of ex-core sensors over a defined area divided into a plurality of zones. The monitoring system generates both on-line, real time displays of two dimensional and three dimensional reactor core power distribution characteristics for use in reactor operation and surveillance and off-line, periodically updated detailed summaries of three dimensional reactor core power and burnup distributions for use in future reactor core fuel design activities.

The plurality of sensors, for example, core-exit thermocouples, are positioned to monitor at least a portion of the zones within the defined area. Each of the sensors provides an output representative of the corresponding parameter monitored. Additionally, means are provided for computing physical quantities from the outputs of the sensors and for interpolating among the physical quantities to provide display outputs representative of the interpolated value of the physical quantities in two dimensions in each of the corresponding zones. The respective interpolated values are then visually displayed according to each of the corresponding zones.

Further, means are provided for integrating the physical quantities derived from the outputs of the core-exit thermocouples with other physical quantities derived from ex-core neutron detectors to provide information relevant to the full three dimensional reactor core power distribution and the full three dimensional reactor core burnup distribution, and for visually displaying and permanently recording this information.

More specifically, as illustrated in the exemplary embodiments set forth hereinafter, a first aspect of the inventive system comprises a visual display system suitable for displaying two dimensional (X-Y) characteristics of nuclear power reactor core power distributions in a PWR nuclear power reactor environment. In one embodiment, a reactor radial core power distribution is displayed by using color modulation over a core map display—the more brightly colored areas in the map corresponding to the hotter areas of the core. The active display area is divided into blocks, each representing a fuel assembly or a portion of a fuel assembly. Interpolation for assemblies not monitored directly by thermocouples is provided for a coherent display. Additionally, visual alarm provisions are described for indicating physical quantities which are outside predetermined limits.

More specifically, specific embodiments of this first aspect of the present invention are directed towards a radial power monitor (RPM) which uses the output signals from core-exit thermocouples to calculate two dimensional, assemblywise X-Y power distributions. One of the visual displays produced comprises deviations of the derived X-Y power distribution from a reference X-Y power distribution determined from a periodically determined full-core flux map obtained with an in-core movable detector system or from a defined reference X-Y power distribution obtained earlier through use of the core-exit thermocouple system. The deviations are calculated and presented to an operator on a high-resolution color-graphic CRT either to demonstrate that no anomalies in power distribution exist in the core or to identify any apparent anomalies that exist in the core power distribution.

Again, more specifically, as illustrated in the exemplary embodiments set forth hereinafter, a second aspect of the inventive system comprises a computational, visual display, and permanent recording system suitable for synthesizing, displaying and recording three dimensional (X-Y-Z) characteristics of nuclear power reactor core power and burnup distributions in a PWR nuclear power reactor environment. In one embodiment, the results of a three dimensional reactor core power distribution synthesis developed from ex-core neutron detector or few-string fixed in-core detector signals, by application of well known methodology, is refined and modified by a novel method that utilizes the information obtainable from core-exit thermocouples to generate an on-line, real time estimate of the actual three-dimensional reactor core power distribution that more faithfully reproduces the actual three dimensional power distribution of the reactor core than does the unrefined and unmodified three dimensional power distribution derived exclusively from the ex-core nuclear detector or few-string fixed in-core detector signals. The synthesized three dimensional power distribution information is then cast in a form suitable for producing one dimensional, two dimensional and psuedo-three dimensional visual displays of the reactor core power distribution characteristics based, in part, on the color modulation display methods noted above.

Further, by utilizing well known methods to incrementally accumulate local burnup values in a plurality of local three dimensional zones in the core on the basis of local nuclear power values derived from the refined and modified three dimensional synthesis application noted above, together with incorporation of the value of the time interval between successive syntheses of the three dimensional core power distribution as noted above, and with the inclusion of readily derivable physical factors for conversion of units, current values of the three dimensional core burnup distributions in each of a plurality of axial nodes of each fuel assembly or defined portion of each fuel assembly are maintained and are periodiclly recorded on a suitable recording device such as a magnetic tape unit or a line printer.

More specifically, specific embodiments of this second aspect of the present invention are directed toward a three dimensional core power monitor (CPM) which combines the signals from the ex-core neutron detectors or from a few strings of fixed in-core detectors with signals from the core-exit thermocouples to calculate three dimensional nodal X-Y-Z power distributions and to accumulate three dimensional nodal core burnups. Several of the visual displays produced comprise deviations of the derived X-Y-Z power distribution from a reference X-Y-Z power distribution at successive selected elevations in the core. The X-Y-Z power distribution is determined from a periodical full core flux map obtained with an in-core movable detector system or from analytical three dimensional calculations of core characteristics. The deviations are calculated and presented to an operator in pseudo three dimensional form on a high resolution color-graphics CRT that is sufficiently precise to identify any apparent anomalies in the core power distribution.

The CPM is periodically recalibrated based on in-core flux maps to assure system accuracy.

BRIEF DESCRIPTION OF THE DRAWING

A full understanding of the invention can be gained from the following description when read in conjunction with the accompanying drawings in which:

FIG. 4 shows a block diagram of an embodiment of a first aspect of the inventive system;

FIG. 5 shows a block diagram of a portion of the embodiment of the first aspect of the inventive system which generates libraries of reference values;

FIG. 7 shows a display, in accordance with the first aspect of the inventive system, of deviations from a reference relative enthalpy rise distribution in a nuclear core where a single control rod has been partially inserted into the core;

FIG. 10 shows a psuedo three dimensional display, in accordance with the second aspect of the inventive system, of deviations from a reference three dimensional power distribution in a nuclear core when a bank of control rods has been partially inserted in the core in compensation for a core power level reduction.

To facilitate understanding, identical reference numerals are used to designate elements common to the figures.

DESCRIPTION OF THE PREFERRED EMBODIMENT

Figure 1:
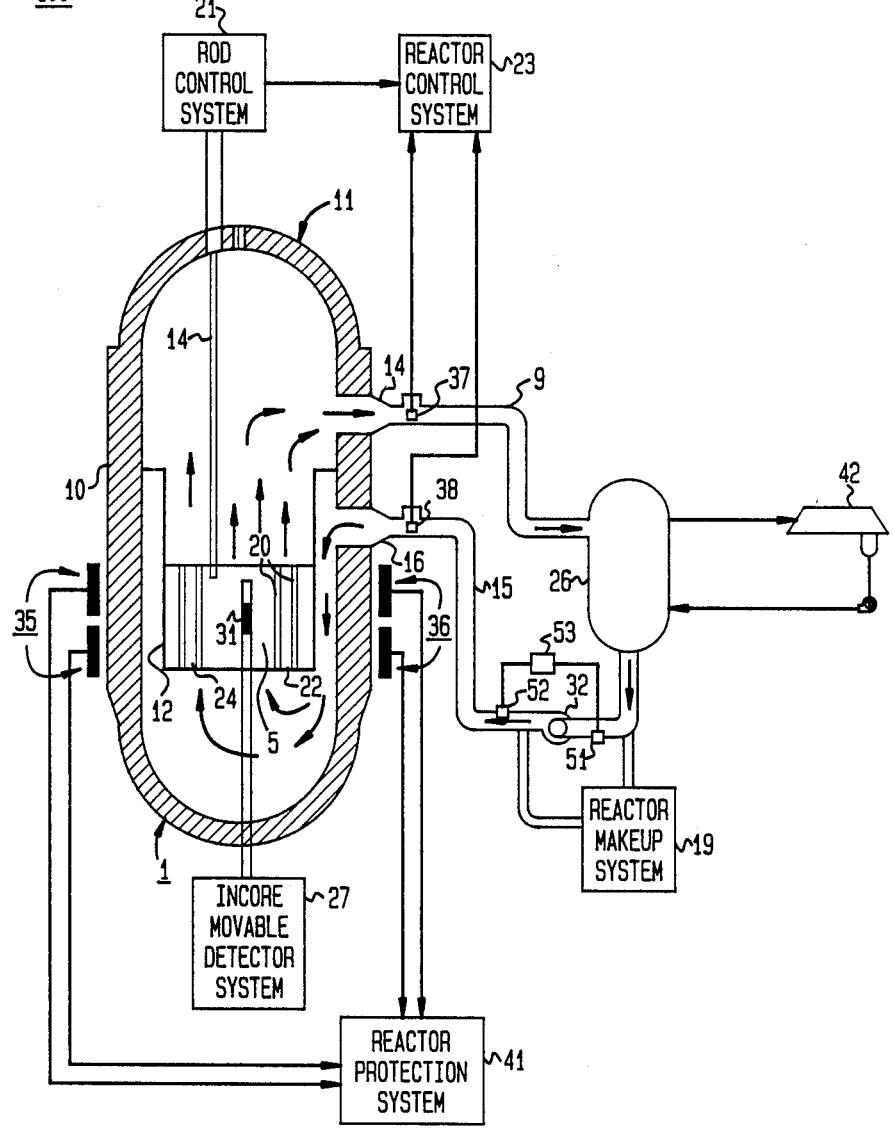
FIG. 1 is a schematic diagram of a typical pressurized water reactor (PWR)

FIG. 1 shows a schematic representation of the nuclear steam supply system 100 of a typical pressurized water reactor (PWR) 1 for generating electric power which can employ the method and apparatus of the present invention to more accurately monitor the radial and three dimensional power profiles within the core to avoid the operating difficulties experienced by the prior art. As shown in FIG. 1, PWR 1 includes a vessel 10 which forms a pressurized container when sealed by its head assembly 11. The vessel 10 has coolant flow inlet means 16 and coolant flow outlet means 14 formed integral with and through its cylindrical walls. As is known in the art, the vessel 10 contains a nuclear reactor core 5 of the type previously described consisting mainly of a plurality of clad nuclear fuel elements 20 (only a few of which are shown) arranged in assemblies, for example assemblies 22 and 24, which generate substantial amounts of heat, depending primarily upon the position of the full length control rods such as 14. Fission reactions within the core 5 generate heat which is absorbed by a reactor coolant, for example light water, which is passed through the core 5. The heat is conveyed from the core by coolant flow entering through inlet means 16 and exiting through outlet means 14. Generally, the flow exiting through outlet means 14 is conveyed through an outlet conduit, hot leg 9, to a heat exchange steam generator system 26, wherein the heated coolant flow is conveyed through tubes which are in heat exchange relationship with water which is evaporated to produce steam. The steam produced by the generator is commonly utilized to drive a turbine-generator 42 to produce electric power. The cooled reactor coolant is conveyed from the steam generator 26 through a cold leg conduit 15 by reactor coolant pump 32 to inlet means 16. After being delivered to the reactor pressure vessel 10 through inlet means 16, the coolant is forced to circulate downwardly around the outside of a core barrel assembly 12 and upward through the interior of the core 5, through the coolant channels formed by the assemblies, whereby the reactor coolant cools the core 5 and its fuel rods 20. A pressurizing system (not shown) is provided to maintain the pressure of the reactor coolant with certain acceptable limits. Thus, a closed recycling primary loop is provided with the coolant piping coupling the vessel and the steam generator. The vessel illustrated in FIG. 1 only shows one steam generator for clarity, however, it is adaptable for more than one such closed fluid system or loop, though, it should be understood that the number of such loops varies from plant to plant and commonly two, three, or four are employed.

The reactivity of reactor core 5 is controlled by dissolving a neutron absorber, such as boron, in the reactor coolant, and by the insertion into the core of control rods, for example control rod 14. The boron concentration of the reactor coolant is regulated by a reactor makeup system 19 which extracts coolant from the cold leg 15 upstream of the reactor coolant pump 32, adds or removes boron as appropriate, and returns the coolant with the proper boron concentration to the cold leg 15 downstream of the pump 32. The control rods, such as control rod 14, which are made of neutron absorbing material, are inserted into and withdrawn from the reactor core 5 by a rod control system 21. The rod control system 21 receives commands from the reactor control system 23. Typically, control rods are moved in groups, which groups are referred to as control rod banks. This rod control system 21 is well known in the art and provides one measure of the position of every control rod.

Ex-core neutron detectors such as detectors in detector systems 35 and 36 monitor the neutron flux, and therefore the power level of reactor core 5. In addition, most PWRs are provided with an in-core movable detector system 27 for detecting neutrons which includes a number of thimbles 29 distributed across the core 5 through which movable detectors 31 may be inserted to generate a detailed map of the power distribution in the core. Such mapping is performed periodically, such as monthly, to determine if there are any potential or actual limiting hot spots in the core.

Some PWRs are provided with a fixed in-core detector system (not shown) in which strings of detectors are permanently positioned in thimbles similar to thimbles 29. If the number of strings of fixed in-core detectors installed in the reactor is sufficiently large (on the order of forty or more) these installations do not require the in-core movable detector system 27. However, the costs associated with the installation and use of such many-string fixed in-core detector systems tend to be relatively large and so these systems are not universally used. If the number of strings of fixed in-core detectors installed in the reactor is sufficiently small (not exceeding eight in typical installations), the associated costs are modest, but the availability of an in-core movable detector system appears to be unavoidable.

Figure 2:
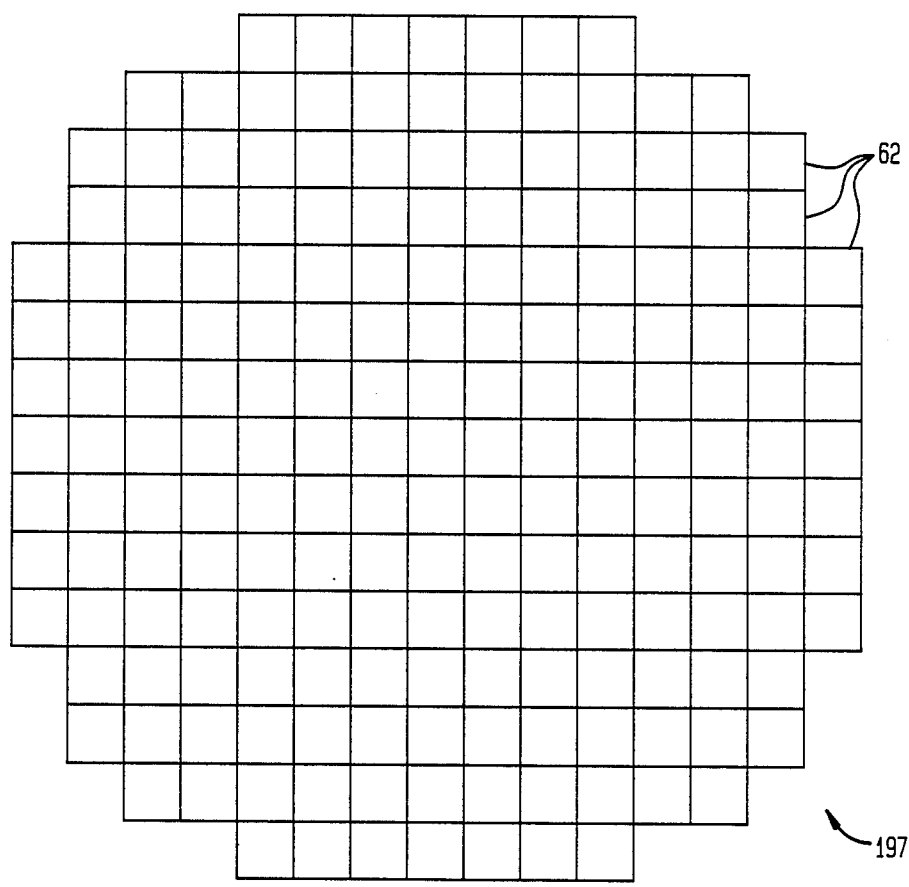
FIG. 2 is a core map which is a plan view of the reactor core of a PWR.

FIG. 2 shows core map 197 which is a plan view of the reactor core 5 comprising fuel rod assemblies 62. In present practice, there are thermocouples installed at or just above the outlet nozzles of a fraction of the fuel assemblies in most commercial pressurized water nuclear power reactors. These thermocouples will be referred to hereinafter as core-exit thermocouples. Typical reactor cores generally consist of from approximately one hundred to more than two hundred assemblies and the thermocouples are usually located at approximately one out of four fuel rod assemblies.

Figure 3:
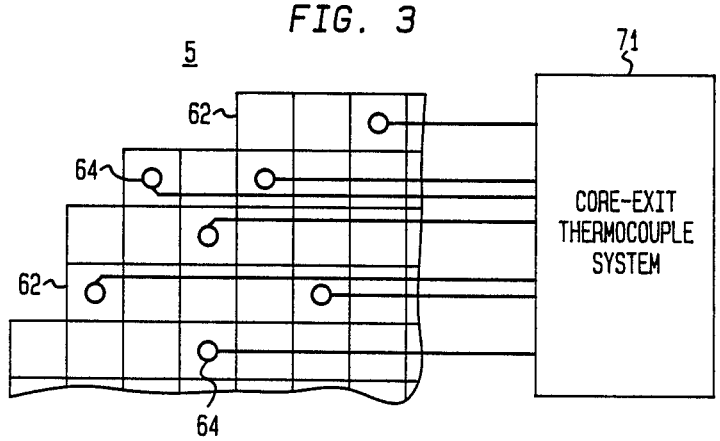
FIG. 3 is a plan view of the reactor core of a PWR which shows the relative position of fuel rod assemblies and an exemplary arrangement of core-exit thermocouples within the fuel assembly locations.

FIG. 3 shows a plan view of reactor core 5 which illustrates the relative position of the fuel rod assemblies 62, along with an exemplary arrangement of the core-exit thermocouples 64 within the fuel assembly locations 62. The outputs from the core-exit thermocouples 64 are sent to core-exit thermocouple system 71. Typically, the core-exit thermocouple system 71 periodically samples the thermocouple voltages and converts them to digital values in convenient engineering units, °F. or °C. Temperatures corresponding to the electrical outputs from core-exit thermocouples 64 are presently printed on a line printer by the supervisory plant computer (not shown). However, information in this form does not lend itself to easy interpretation by the plant operator and is not otherwise used.

For more effective information transfer, the first aspect of present invention provides a coherent pictorial presentation of the radial power distribution for the fuel rod assemblies 62. The visual display employed utilizes a color display over a core map, similar to the core map 197 shown in FIG. 2. In one embodiment of the present invention, the display comprises deviations of the core power from reference values provided by the core flux map which is periodically made or from reference values from a previous thermocouple-generated power distribution. If there is no deviation, within certain preset limits, then the color chosen to display that fact is green. As the assembly power decreases from that of the equivalent reference, the color changes to add more and more blue. Conversely, when the assembly power increases from that of the reference, the color changes to add more and more red so as to change from yellow to orange to red.

The active display area is divided into blocks corresponding to the relative location of the fuel assemblies 62 within the core 5 or to subregions, such as quarters of fuel assemblies at the respective relative locations. As described above, in present day reactors, there are approximately one-fourth the number of core-exit thermocouples as fuel rod assemblies. In order to have a coherent display, hypothetical temperature signals must be derived for the other three quarters of the fuel assemblies. For this purpose, a surface spline algorithm is used to interpolate for assemblies or subregions of assemblies not directly covered by thermocouples and thereby to provide a coherent display. Additionally, visual and/or audio alarm provisions are included to indicate when either deviations from reference values or inferred absolute values of power distribution fall outside preset limits.

In accordance with the above, a first aspect of this invention may be generally understood by reference to the block diagram of FIG. 4. Each of the individual blocks illustrated in FIG. 4 is set out in greater detail in the figures following hereafter. In addition it will be apparent that the preferred embodiment of this aspect of the present invention comprises a set of computational algorithms and computational control logic embodied in computer software which is executed on a digital computer. Block 71 represents a core-exit thermocouple system which receives the outputs of the thermocouples, as shown in FIG. 3. The signals derived from the thermocouples, representative of the relative temperatures encountered within the corresponding core locations, are fed from Core-Exit Thermocouple System 71 to a Signal Processing Unit, represented by block 72 (As described below, Signal Processing Unit 72 comprises Thermocouple $F_{\Delta H}$ Calculator 91 and $F_{\Delta H}$ Deviation Calculator 92). Signal Processing Unit 72 processes the signals into compatible form to interface with the Interpolator 73 (As described below, Interpolator 73 comprises $F_{\Delta H}$ Deviation Interpolator/Extrapolator 93, Current Assemblywise $F_{\Delta H}$ Synthesizer 106, Power Distribution Deviation Calculator 103, and Relative $F_{\Delta H}$ Deviation Classifier 94). The respective signals, representative of the power of the assemblies, are then fed to Display Interface 74 (As described below, Display Interface 74 comprises Two-Dimensional Graphics Generator 95) which processes the signals into a form compatible with the Display Device 75 (As described below, Display Device 75 comprises Graphics Monitor 100).

As shown in FIG. 5, calibration factors for use in embodiments of the present invention are calculated on a periodic basis in Core-Exit Thermocouple Calibrator Module 80 by inputting thereto measurements from (1) In-Core Movable Detector System 27 in response to data received from movable detectors 31 or from Fixed In-Core Detector System, if provided; (2) Core-Exit Thermocouple System 71 in response to data received from core-exit thermocouples 64; (3) Reactor Control System 23 in response to data received from hot-leg temperature detector 37 and cold-leg temperature detector 38; and (4) Reactor Protection System 41 in response to data received from pressure system 51–53. In accordance with methods well known in the art, Core-Exit Thermocouple Calibrator Module 80 computes and stores the following information for use in the manner to be explained in detail below:

(1) a library 84 of self consistent calibration factors for the individual core-exit thermocouples 64;

(2) a library 85 of reference "assemblywise" relative enthalpy rise values, $F_{\Delta H}$, for all fuel assembly locations in the core, which reference values are obtained from a core flux map provided by In-Core Movable Detector System 27 or, if provided, by a Fixed In-Core Detector System; and (3) a library 86 of reference relative enthalpy rise values, $F_{\Delta H}$, for the respective functioning core-exit thermocouples 64 in the reactor vessel, which reference values are obtained from a core flux map provided by In-Core Movable Detector System 27 or, if provided, by a Fixed In-Core Detector System. The contents of library 86 are in fact a subset of the contents of library 85.

These data in libraries 84 through 86 and in libraries 87 through 88, noted later, are stored for later use. In one embodiment of the present invention the libraries are stored in a computer memory, in another embodiment, they are stored on computer peripheral equipment such as on magnetic disk storage.

Libraries 84 through 86 are updated infrequently, typically once each effective full power month of plant operation. The apparatus and methodology of systems 23, 27, 38, 41, 51–53, 71, and 80 used to create libraries 84 through 86 are well known in the art, and, as such, are not included in this disclosure.

Figure 6:
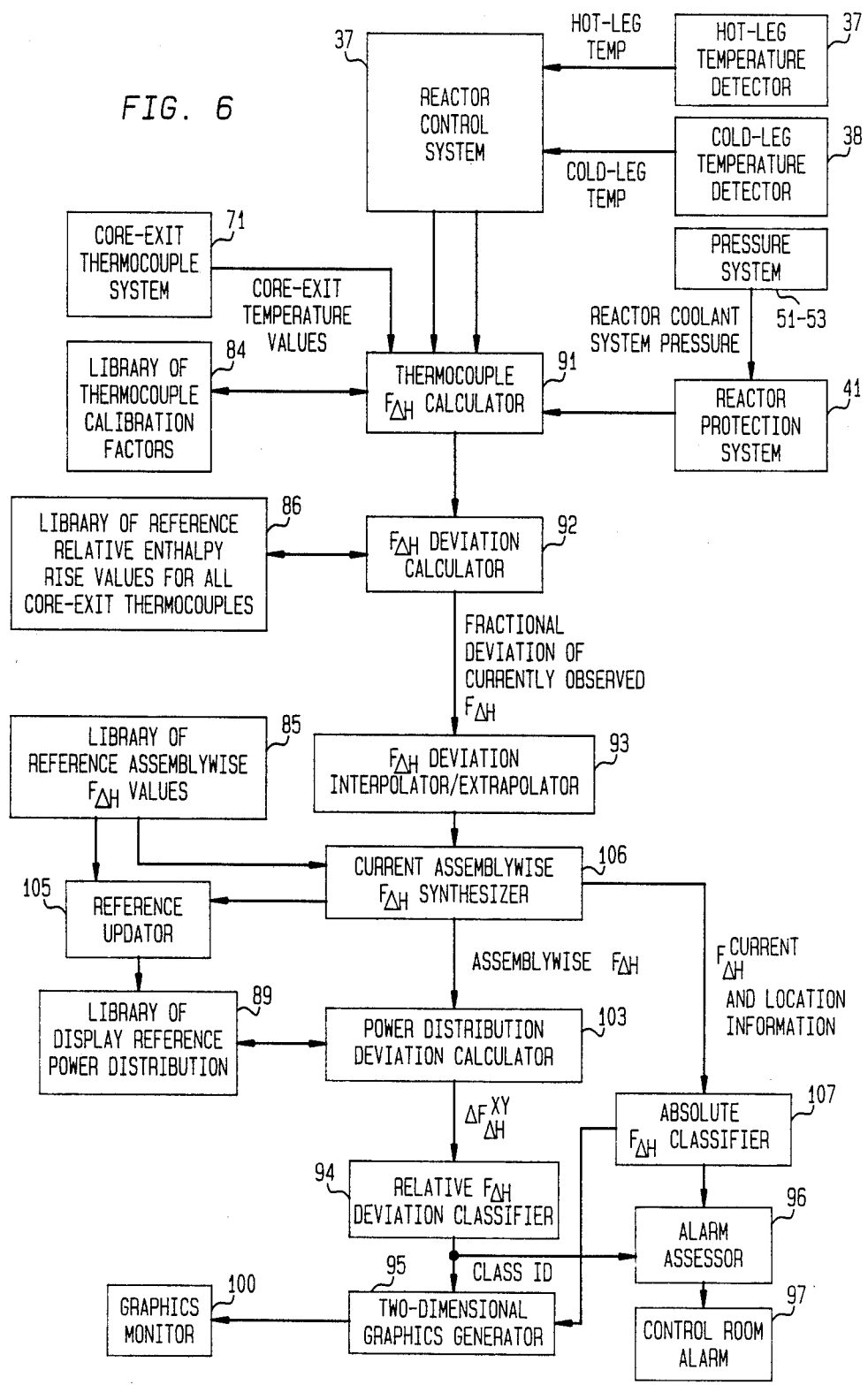
FIG. 6 shows, in greater detail, a block diagram of the embodiment of the first aspect of the inventive system shown in FIG. 4.

The details of the operation of this aspect of the present invention are now described with reference to FIG. 6. Core-Exit Thermocouple System 71 generates the actual coolant core-exit temperature values used in the inventive system in real time, i.e., as the measurements are received from the core-exit thermocouples 64; the core-exit thermocouples 64 are passive and operate continuously. Core-Exit Thermocouple System 71, which processes the output signals from the core-exit thermocouples 64, operates frequently, and in real time, in response to (1) a preset elapsed time signal, typically on a 30 second update cycle, or (2) a preset change in control bank position or (3) a change in power level signal, typically, 10 steps of control bank movement or 3 percent in power level, respectively, and initiates operation of the remainder of the system. Again the methodology and apparatus of Core-Exit Thermocouple System 71 is well known in the art and, as such, is not included in this disclosure.

The core-exit temperature values computed in Core-Exit Thermocouple System 71; the hot leg temperature and cold leg temperature obtained from resistance temperature detectors 37 and 38 shown in FIG. 1, respectively, and passed through Reactor Control System 23; and reactor coolant system pressure obtained from pressure system 51–53 shown in FIG. 1 and passed through Reactor Protection System 41; are all input into Thermocouple $F_{\Delta H}$ Calculator 91. Thermocouple $F_{\Delta H}$ Calculator 91 then converts the inputs into values of the difference between the enthalpy of the coolant leaving the core and that of the coolant entering the core at the fuel assemblies at which actual thermocouples are positioned, using the library of thermocouple calibration factors 84 and methods well known in the art.

The $F_{\Delta H}$ values generated in Thermocouple $F_{\Delta H}$ Calculator 91, $F_{\Delta H}{}^{j(obs)}$, and reference $F_{\Delta H}$ values from library 86, $F_{\Delta H}{}^{j(ref)}$, are transmitted to $F_{\Delta H}$ Deviation Calculator 92. $F_{\Delta H}$ Deviation Calculator 92 then computes the fractional deviation of the currently observed $F_{\Delta H}$ values for each functioning core-exit thermocouple 64 from the corresponding reference value according to the relation:

$$dF_{\Delta Hj} = (F_{\Delta H}{}^{j(obs)} - F_{\Delta H}{}^{j(ref)})/F_{\Delta H}{}^{j(ref)} \qquad (1)$$

where j signifies any given functioning core-exit thermocouple.

The fractional deviation values for each functioning thermocouple 64 are passed to the $F_{\Delta H}$ Deviation Interpolator/Extrapolator 93 which uses the fractional deviation values, together with stored values of the geometric coordinates of the locations of the respective core-exit thermocouples, to generate a mathematical function that characterizes the distribution of the fractional deviations of $F_{\Delta H}$ over the entire reactor cross section, and subsequently provides the estimated $F_{\Delta H}$ fractional deviation value at each fuel assembly location and/or at the center of each quarter of each fuel assembly in the core. Although many different mathematical techniques could be used to provide the estimates, a preferred mathematical technique used to generate the estimates is referred to in the literature as the "Surface Splines Method" and is in common use in a variety of two dimensional interpolation applications.

The deviation values of the observed parameters, as well as the estimated deviations, are transmitted to the Current Assemblywise $F_{\Delta H}$ Synthesizer 106. The Current Assemblywise $F_{\Delta H}$ Synthesizer 106 determines the assemblywise values of power, $F_{\Delta H}$, using the Library of Reference Assemblywise $F_{\Delta H}$ Values 85. These assemblywise values power, $F_{\Delta H}$, are then provided to Power Distribution Deviation Calculator 103. The Power Distribution Deviation Calculator 103 generates the deviation values, $dF^{XY}{}_{\Delta H}$, for display using the Library of Display Reference Power Distribution 89.

On command, Reference Updater 105 replaces the stored values in Library of Reference Display Power Distribution 89 with the current thermocouple based power distribution produced by the Current Assemblywise $F_{\Delta H}$ Synthesizer 106 or the Library of Reference Assemblywise $F_{\Delta H}$ Distribution 85. By periodically exercising Reference Updater 105, either upon manual initiation or automatically on periodic update, during periods of reactor maneuvering, the operator can avoid generating indications of what would otherwise appear to be significant anomalies in power distribution when in fact, the so-called anomalies are simply the result of conventional operations under the operator's control, such as control bank insertion during a load reduction.

The deviation values, $dF^{XY}_{\Delta H}$, produced by Power Distribution Deviation Calculator 103 are then transmitted to Relative $F_{\Delta H}$ Deviation Classifier 94. The Relative $F_{\Delta H}$ Deviation Classifier 94 classifies the deviation value at each fuel assembly or quarter of a fuel assembly location according to the sign and magnitude of the deviation value and a class identification parameter is associated with the corresponding location indices. In the preferred embodiment, a total of 11 classifications are considered. The spectrum of fractional deviation values covered by the set of classes is continuous, with the upper bound of one class being also the lower bound of the next higher class. The lowest and highest classes, class 1 and class 11, in this embodiment, are each unbounded on one side so as to encompass all "extreme" deviation values. Two-Dimensional Graphics Display Generator 95 relates the class identification parameter value to a specified color, using, in this embodiment, a look-up table. Two-Dimensional Graphics Display Generator 95 generates a block of the appropriate color corresponding to a fuel assembly or quarter of a fuel assembly at the appropriate relative location on a graphics monitor 100.

In this embodiment green was chosen to correspond to class 6 with boundaries of approximately $\pm 0.03$ in $F_{\Delta H}$ fractional deviation. Thus, if no anomalies in core power distribution exist, i.e. the current core wide $F_{\Delta H}$ distribution is very similar to the reference $F_{\Delta H}$ distribution, the entire core cross section on the display screen would be a uniform green color.

FIG. 7 shows a display corresponding to the case where a control rod located at coordinates D-12 was partially inserted into the core. This insertion depresses power generation in the vicinity of the control rod and causes a broadly based, moderate increase in power generation on the opposite side of the core since in this case total power output was maintained constant despite the insertion of the single control rod.

For human factors purposes, progressively larger negative deviations are assigned progressively darker shades of blue; progressively larger positive deviations yield progressively brighter colors, passing from yellow through orange to red. Thus, the transition from an all green core cross section display to one containing regions or contours of other colors provides an immediate visual indication to the reactor operator that the core radial power distribution has changed. The specific colors that appear are indicative of the relative severity of the change and the distribution of the regions and/or contours provides a readily recognized "signature" of the type and probable cause of the change. In the illustration shown in FIG. 7, region 501 is light blue, region 502 is made up of progressively smaller nominally concentric areas of progressively darker blue, region 503 is yellow, and region 504 is light orange.

In an additional feature of this aspect of the present invention, the array of class identification parameter values generated by Relative $F_{\Delta H}$ Deviation Classifier 94 is periodically and automatically scanned by Alarm Assessor 96, and an audible and/or visual alarm is generated by Control Room Alarm 97 upon detection of a class identification parameter lying outside a predetermined acceptable range. The alarm draws the operator's attention to the fact that an anomaly of some sort exists in the core power distribution and that displays of the current deviation values and of the current absolute values should be viewed for diagnosis and evaluation.

In yet a further additional feature of the present invention, the core wide estimated $F_{\Delta H}$ fractional deviation distribution values generated by $F_{\Delta H}$ Deviation Interpolator/Extrapolator 93 are combined with the values of $F_{\Delta H}$ in Reference Assemblywise $F_{\Delta H}$ Distribution Library 85 in Current Assemblywise $F_{\Delta H}$ Synthesizer 106 to generate current estimates of the distribution of absolute $F_{\Delta H}$ values. An appropriate mathematical expression describing this process is:

$$F^{current}_{\Delta H;k,l} = F^{ref}_{\Delta H;k,l} \ast (1 + \sigma F_{\Delta H;k,l}) \qquad (2)$$

where the indices k and l identify the geometric location in the core cross section at which the value of $F^{current}_{\Delta H;k,l}$ exists.

The array of current $F_{\Delta H}$ values and the appropriate location data are passed to Absolute $F_{\Delta H}$ Classifier 107. Absolute $F_{\Delta H}$ Classifier 107 sorts the absolute $F_{\Delta H}$ values into classes in the same manner as was described above with respect to Relative $F_{\Delta H}$ Deviation Classifier 94. The array of absolute class identification numbers is then passed to the Two Dimensional Graphics Display Generator 95 and is converted into a multicolor core cross-section display in which the "hotter" assemblies are indicated by progressively brighter colors, with red indicating "very hot" assemblies which are characterized by $F_{\Delta H}$ values greater than a preset limit and the "cooler" assemblies, by progressively darker shades of blue. With this display an operator can immediately assess whether the core contains any assemblies that are operating at a relative power level greater than that permitted in the plant Technical Specifications.

In yet a still further additional feature of this aspect of the present invention, the array of class identification parameter values generated by Absolute $F_{\Delta H}$ Classifier 107 is periodically and automatically scanned by Alarm Assessor 96, and an audible and/or visual alarm is generated upon detection of a class identification parameter lying outside a predetermined acceptable range. The alarm draws the operator's attention to the fact that an anomaly of some sort exists in the core power distribution and that displays of the current deviation values and of the current absolute values should be viewed for diagnosis and evaluation.

Figure 8:
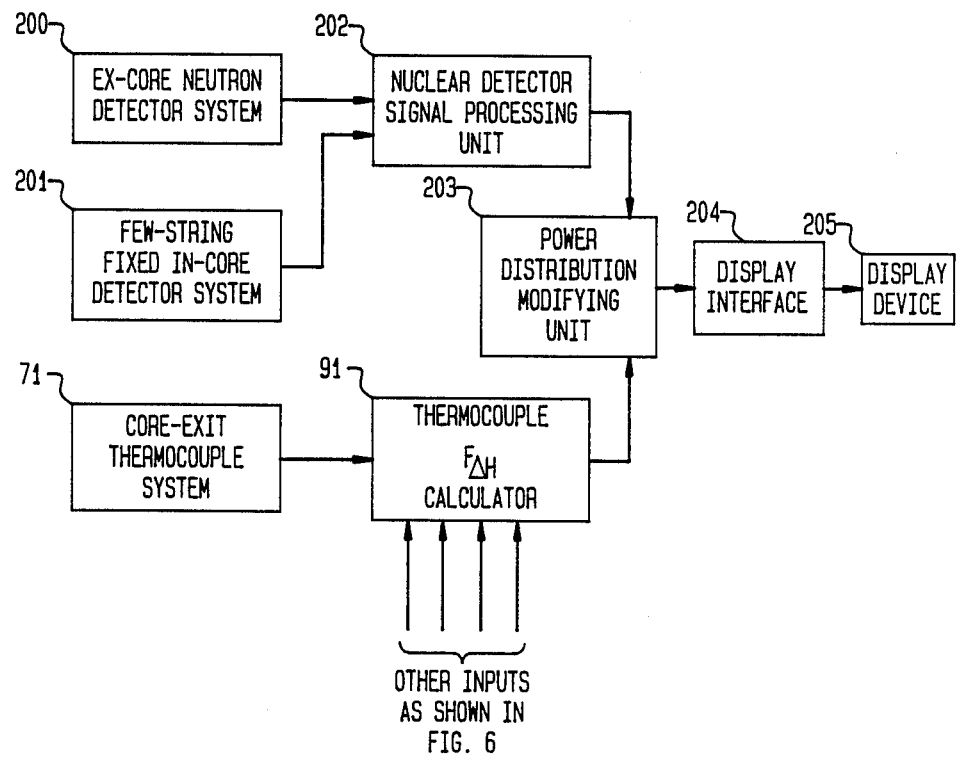
FIG. 8 shows a block diagram of an embodiment of a second aspect of the inventive system.
Figure 9:
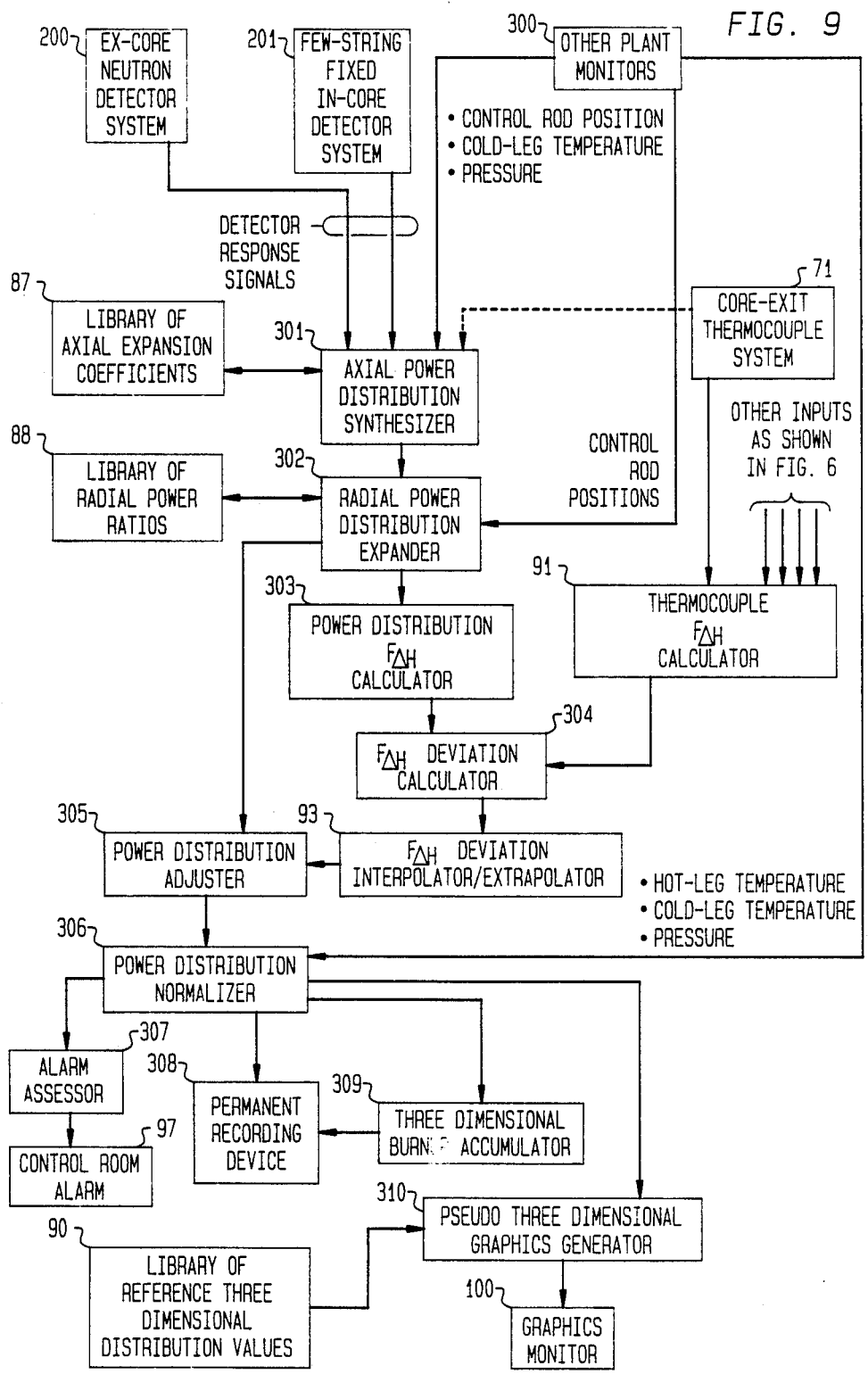
FIG. 9 shows, in greater detail, a block diagram of the embodiment of the second aspect of the inventive system shown in FIG. 8.

A second aspect of this invention may be generally understood by reference to the block diagram of FIG. 8. Each of the individual blocks illustrated in FIG. 8 is set out in greater detail in FIG. 9. Again, it will be apparent that the preferred embodiment of this second aspect of the present invention comprises a set of computational algorithms and computational control logic embodied in computer software which is executed on a digital computer.

Referring to FIG. 8, block 200 represents a conventional ex-core neutron detector system consisting of one or more sets of two or more neutron sensitive nuclear detectors, for example detector sets 35 and 36 shown in FIG. 1, wherein the detectors, sometimes referred to as the "sections," of each set are arrayed one above the other over a span roughly comparable to the height of the core. Alternatively, block 201 represents a system comprised of a few (typically, four or eight) strings of fixed in-core neutron or gamma ray sensitive nuclear detectors that are arrayed in a specified pattern, either among or within selected fuel assemblies in the core. Each string consists of several (typically, four to seven) individual sensors mounted one above the other in a common thimble or tube. Either the Ex-Core Neutron Detector System 200 or the Few-String Fixed In-Core System 201 is required; however, both systems would not commonly be used concurrently. The signals derived from the sensors in block 200 or block 201, representative of components of the axial nuclear power distribution in the region or regions of the core monitored by the respective detector sets or strings, are directed to Nuclear Detector Signal Processing Unit 202 (As described below, the Nuclear Detector Signal Processing Unit 202 comprises Axial Power Distribution Synthesizer 301, Radial Power Distribution Expander 302, and Power Distribution $F_{\Delta H}$ Calculator 303). The Nuclear Detector Signal Processing Unit 202 processes the input ex-core or incore detector signals into compatible form to be passed to Power Distribution Modifying Unit 203 (As described below, the Power Distribution Modifying Unit 203 comprises $F_{\Delta H}$ Deviation Calculator 304, $F_{\Delta H}$ Deviation Interpolator/Extrapolator 93 and Power Distribution Adjuster 305).

As shown in FIG. 8, Core-Exit Thermocouple System 71 and Thermocouple $F_{\Delta H}$ Calculator 91 are identical to, and perform the same functions as, the identically numbered components described above. The output signals from the Power Distribution Modifying Unit 203, which are representative of the synthesized current three dimensional power distribution in the reactor core, are passed to Display Interface 204 which processes the signals into a form compatible with Display Device 205.

This second aspect of the present invention utilizes the Core-Exit Thermocouple Calibrator 80, described above, in the same manner as noted above, to extract a library of Thermocouple Calibration Factors 84 from the results of sets of concurrently measured core flux maps and core-exit temperature maps. In addition, a Nuclear Detector Calibrator (not shown) generates a Library of Axial Expansion Coefficients 87. The methodology and techniques used to determine the values of the expansion coefficients depend to some degree on the particular type of nuclear detector used, but all utilize information derived from flux maps as input. All relevant methodologies and techniques are well known in the art.

A Library of Radial Power Ratios 88 is generated by application of simple editing methods to the results either of one or more flux maps obtained in the applicable reactor core or of detailed three dimensional calculations using an analytical model representative of the applicable reactor core. The methodology for obtaining such a library is well known to those of ordinary skill in the art.

The details of the operation of this second aspect of the present invention are now described with reference to FIG. g. Ex-core Neutron Detector System 200 or Few-String Fixed In-Core Detector System 201 generates nuclear detector signal values in real time, i.e. as signals are received from sensors such as the sensors of detector systems 35 and 36 shown in FIG. 1. The sensors themselves may be externally powered or self powered and operate continuously. Ex-core Neutron Detector System 200 or Few-String Fixed In-Core Detector System 201 also operates continuously to process the raw sensor signals and to pass the conditioned output signals to the Axial Power Distribution Synthesizer 301. The methodolgy and apparatus of both detector systems 200 and 201 are well known in the art and is not included in this disclosure.

The conditioned detector signals generated by Ex-Core Neutron Detector System 200 or Few-String Fixed In-Core Detector System 201, together with readings of control rod positions, cold-leg temperature and reactor coolant system pressure derived from Rod Control System 21, cold-leg temperature detector 38 and Pressure system 51–53, respectively, (which detectors and systems are generically grouped into Other Plant Process Monitors 300), are input into Axial Power Distribution Synthesizer 301. If the nuclear detectors in use in a particular application of the present invention are of a type referred to in the art as "two-section ex-core detectors or, equivalently, "long ion chambers," a small number of core-exit temperature values computed in Core-Exit Thermocouple System 71 may also be input to Axial Power Distribution Synthesizer 301. Axial Power Distribution Synthesizer 301 combines the input signals with the coefficient values stored in Library of Axial Expansion Coefficients 87 to generate a pointwise representation of the axial nuclear power distribution in the region of the reactor core nearest to, or including, the nuclear detectors. Methodologies appropriate for use in Axial Power Distribution 301 are well known in the art. In addition, a method for using the outputs from two-section ex-core detector systems to provide the axial power distribution is disclosed in a patent application assigned to the present assignee of this patent application. The application, having Ser. No. 850,195 and being entitled "Axial Power Distribution Monitor And Display Using Outputs From Ex-Core Detectors And Thermocouples," was filed on Apr. 10, 1986 and is incorporated by reference herein.

The values representing the axial power distribution are supplied to Radial Power Distribution Expander 302 in which an estimated representation of the current three dimensional power distribution is generated by applying the simple relationship:

$$r^{est}_{i,j,k} = q_k * p_{i,j}/p_{i',j'} \qquad (3)$$

where:

$r^{est}_{i,j,k}$ is the "first cut" local nuclear power level at the radial location (i,j) and the axial location (k) in the reactor core;

$q_k$ is the value at axial location (k) of the axial power distribution generated by Axial Power Distribution Synthesizer K; and $p_{i,j}/p_{i',j'}$ is the radial power ratio relating local power level at radial location (i,j) to local power level at the reference radial location (i',j') at which the axial power distribution $q_k$ is defined.

Values appropriate to all radial locations of interest and to all axial core regions of interest are stored in Library of Radial Power Ratios 88.

An axial core region may be defined by a unique arrangement of inserted control rods, whence control rod position information derived from Other Plant Process Monitors 300 is supplied as input to Radial Power Distribution Expander 302, or by the nuclear characteristics of the reactor fuel which may vary axially in current reactor core designs.

The $r^{est}_{i,j,k}$ values which describe the nominal three dimensional power distribution in the reactor core are passed to Power Distribution $F_{\Delta H}$ Calculator 303. In Power Distribution $F_{\Delta H}$ Calculator 303, values are determined for the relative enthalpy rise parameter $F^{PD}_{\Delta H i,j}$ based on the nominal or estimated three dimensional power distribution values at each fuel assembly location (i,j) by application of the relations:

$$F^{PD}_{\Delta H i,j} = \{\Sigma^K_{k=1} r^{est}_{i,j,k}\}/I \quad (4)$$

where:

$$I = \{\Sigma^M_{m=1} \Sigma^N_{n=1} \Sigma^K_{k=1} r^{est}_{m,n,k}\}/N_{TFA} \quad (5)$$

and $N_{TFA}$ is the total number of fuel assemblies in the core.

The values of the power distribution enthalpy rise parameter $F^{PD}_{\Delta H}$ at the fuel assembly locations at which active core-exit thermocouples are available are transmitted to $F_{\Delta H}$ Deviation Calculator 304.

Concurrently, or in close chronological sequence, values of the core-exit coolant temperatures generated by Core-Exit Thermocouple System 71 are passed to Thermocouple $F_{\Delta H}$ Calculator 91, where values of the thermocouple relative enthalpy rise $F^{TC}_{\Delta H}$ are calculated as described above. The resulting values of the thermocouple relative enthalpy rise parameter $F^{TC}_{\Delta H}$ at each active core-exit thermocouple location are also transmitted to $F_{\Delta H}$ Deviation Calculator 304.

In $F_{\Delta H}$ Deviation Calculator 304, values of the fractional deviations of the power distribution relative enthalpy rise parameter from the corresponding thermocouple relative enthalpy rise parameter are calculated according to the relation:

$$\sigma F_{\Delta He} = \{F^{PD}_{\Delta He} - F^{TC}_{\Delta He}\}/F^{TC}_{\Delta He} \quad (6)$$

where e identifies the active core-exit thermocouple locations.

These fractional deviation values $\sigma F_{\Delta He}$ are input to $F_{\Delta H}$ Deviation Interpolator/Extrapolator 93 where, by the methods described above, a complete two dimensional array of values of the fractional deviation of the power distribution relative enthalpy rise parameter from either measured or hypothetical thermocouple relative enthalpy rise parameter values at all fuel assembly locations is developed.

The interpolated/extrapolated array of fractional deviation values, $\sigma F_{\Delta H i,j}$, is then recombined with the nominal three dimensional power distribution values $r^{est}_{i,j,k}$ in Power Distribution Adjuster 305. The recombination takes the form of:

$$r^{adjusted}_{i,j,k} = r^{est}_{i,j,k}/(1 + \sigma F_{\Delta H i,j}) \quad (7)$$

and has the effect of combining ex-core measurements of the radial components of the current actual core power distribution with ex-core or very limited incore measurements of the axial components of the actual power distribution through the agency of deviations from a measured (via periodic flux maps) or analytically calculated reference three dimensional core power distribution.

The adjusted three dimensional power distribution values $r^{adjusted}_{i,j,k}$ are input to Power Distribution Normalizer 306. In Power Distribution Normalizer 306, a value of the total core output power, $Q^{nuclear}$, is computed by application of the relation:

$$Q^{nuclear} = C_1 \{\Sigma^I_{i=1} \Sigma^J_{j=1} \Sigma^K_{k=1} r^{adjusted}_{i,j,k}\} \quad (8)$$

where $C_1$ is a constant that takes into account the units in which the values of the adjusted power distribution are expressed, the fraction of the total core volume associated with typical mesh point i,j,k and the units in which total nuclear power $Q^{nuclear}$, is desired.

Next, a value of the total thermal power output of the core, $Q^{thermal}$, is determined using the relationship:

$$Q^{thermal} = Q_{rated\ full\ power} *$$
$$\{\Delta h_{measured}/\Delta h_{full-power-reference}\} \quad (9)$$

where $\Delta h_{measured}$ is given by:

$$\Delta h_{measured} = h_{out}(\overline{T}_{hot-leg}, P) - h_{in}(\overline{T}_{cold-leg}, P) \quad (10)$$

where:

$h_{out}(\overline{T}_{hot-leg}, P)$ is the enthalpy of the coolant at average hot-leg temperature $\overline{T}_{hot-leg}$ and reactor coolant system pressure P;

$h_{in}(\overline{T}_{cold-leg}, P)$ is similarly defined; and $\Delta h_{full-power-reference}$ is the reactor vessel enthalpy rise corresponding to operation of the reactor at rated full power, and is established by conventional calorimetric techniques during startup and early operation of the plant.

Finally, values of the synthesized three dimensional core power distribution, $r^{synthesized}_{i,j,k}$ are calculated in Power Distribution Normalizer 306 in the form:

$$r^{synthesized}_{i,j,k} = r^{adjusted}_{i,j,k} * \{Q^{thermal}/Q^{nuclear}\} \quad (11)$$

The final pointwise values of the synthesized three dimensional core power distribution $r^{synthesized}_{i,j,k}$ are made available by Power Distribution Normalizer 306 to Alarm Assessor 307 which performs functions very similar to Alarm Assessor 96 and transmits appropriate signals to Control Room Alarm 97. The final pointwise values are also transmitted to Permanent Record Device 308 which is typically a magnetic tape unit or a line printer. Further, the final pointwise values are input to Three Dimensional Burnup Accumulator 309 wherein current values of the three dimensional burnup distribution are periodically updated using the relation:

$$BU_{i,j,k}(t) = BU_{i,j,k}(t - \Delta t) + + r^{synthesized}_{i,j,k} * \Delta t * C_2 \quad (12)$$

in which $\Delta t$ is the length of time interval since the last update and $C_2$ is a constant that is used to convert the units of r and t to the units of BU. Three Dimensional Burnup Accumulator 309 also communicates periodically with Permanent Record Device 308 to permanently record current burnup distributions.

The synthesized three dimensional core power distribution values are also passed to Pseudo Three Dimensional Graphics Generator 310. Pseudo Three Dimensional Graphics Generator 310 functions in a manner similar to Two Dimensional Graphics Generator 95 to develop, at a series of successive elevations in the core, color coded representations of the fractional differences or deviations between the current synthesized power distribution values and the corresponding values in a reference three dimensional pointwise power distribution, as derived either from a reference flux map or from analytical calculations. The pointwise values of the reference three dimensional core power distribution are stored in Library of Reference Three Dimensional Power Distribution Values 90. Typically, the color coding is identical to that used in the Two Dimensional Graphics Generator 95, although a different color coding scheme could be used, if warranted.

FIG. 10 provides an illustration of a "stacked planes" pseudo three dimensional graphics display that appears on Graphics Monitor 100 after control rods ("Five Rod D Bank") have been inserted into the core in response to a power load decrease. In FIG. 10, axis 601 is taken along the axial direction in the core and curve 602 represents the axial power distribution in the core. Planes 700, 750, 800, and 850 represent radial power distributions in the core taken at axial heights indicated by points 605, 610, 615 and 620, respectively, along axis 601. In accordance with the inventive system, (1) in plane 700, regions 701–704 are light orange and region 705 is yellow—indicating that, on the average, the power level in the bottom quarter of the core is somewhat higher than that recorded in the reference three dimensional core power distribution stored in Library of Reference Three Dimensional Power Distribution Values 90; (2) in plane 750, regions 751–754 are light orange, region 755 is green and region 756 is yellow—indicating again that the current core power distribution is shifted slightly toward the bottom half of the core when compared to the reference three dimensional core power distribution (this shift is expected since control rods have been inserted at the top of the core); (3) in plane 800, regions 801–804 are yellow and region 805 is green—indicating only a slight increase in local power in the upper middle quarter of the core due to control rod insertion (the light orange regions in the lower two quarters correspond to yellow zones in the upper middle quarter and are probably the result of radial power redistribution in response to the initiating decrease in total core power level); and (4) in plane 850, 851–855 are light blue and surround regions of dark blue, region 856 is green, and regions 861–864 are yellow—wherein the insertion of the "Five Rod D Bank" control rods cause the similar regions of locally depressed power in the top quarter of the core along with associated regions of slightly higher power (the yellow regions 861–864) in areas radially remote from the control rod X-Y locations (The similarities among the five locally depressed regions of core power in the top quarter of the core show clearly that all control rods in the "Five Rod D Bank" have remained mutually aligned, i.e., no control rod drive malfunction has occurred). Again, other displays based on the same "stacked planes" principle and showing, for example, color coded representations of absolute local power levels can readily be constructed from the synthesized three dimensional power distribution values generated by this second aspect of the present invention.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A sensor monitoring system for displaying a profile of enthalpy rise over a defined area comprising at least a part of a core of a nucelear reactor, which system comprises:

a plurality of core exit temperature sensors positioned to monitor at least a portion of the defined area;

an inlet temperature sensor outside the core and monitoring the temperature of core coolant at an inlet to the reactor;

means, responsive to the outputs from both said temperature sensors and said inlet temperature sensor, for generating corresponding representative fractinal deviation values of the enthalpy rise from reference values;

means for interpolating the generated values of the enthalpy rise to provide an output representaitive of interpolated values of the fractional deviations in enthalpy rise over the entire defined area;

means for classifying the generated values and the interpolated values into a number of different classes; and means for multidimensionally displaying the classes of the generated values and the classes of the interpolated values to present the enthalpy rise profile over the defined area.

2. A sensor monitoring system for displaying a profile of enthalpy rise over a defined area comprising at least a part of a core of a nucelear reactor, which system comprises:

a plurality of core exit temperature sensors positioned to monitor at least a portion of the defined area;

an inlet temperature sensor outside the core and monitoring the temperature of core coolant at an inlet of the reactor;

means, responsive to the outputs from both said temperature sensors and said inlet temperature sensor, for generating corresponding representative values of the enthalpy rise;

means for interpolating the values of the enthalpy rise to provide an output representative of the interpolated values of the enthalpy rise over the entire defined area;

means, responsive to the values, the interpolated values, and reference values of the enthalpy rise, for generating fractional deviations of the values and the interpolated values from the reference values;

means for classifying the deviations into a number of different classes; and means for multidimensionally displaying the classes of the deviations.

3. The sensor monitoring system of claim 1 wherein:

the display means displays the class of the values and the class of the interpolated values in a visual map designed to correspond to the defined area, said map having subdivisions corresponding to portions of the defined area and said subdivisions being color modulated according to the class of the value or the class of the interpolated value corresponding thereto, whereby a relative color variable profile of the enthalpy is displayed over the defined area.

4. The sensor monitoring system of claim 2 wherein:

the display means displays the class of the deviations in a visual map designed to correspond to the defined area, said map having subdivisions corresponding to portions of the defined area and said subdivisions being color modulated according to the class of the deviation corresponding thereto, whereby a relative color variable profile of the deviations is displayed over the defined area.

5. The sensor monitoring system of claim 3 further comprising means for indicating a value or an interpolated value which is outside the limits of a preselected range.

6. The sensor monitoring system of claim 4 further comprising means for indicating a deviation which is outside the limits of a preselected range.

7. The sensor monitoring system of claim 5 wherein said indicating means flashes a light within at least a portion of the map corresponding to the respective subdivision associated with the out-of-limits value or interpolated value.

8. The sensor monitoring system of claim 6 wherein said indicating means flashes a light within at least a portion of the defined area corresponding to the respective subdivision associated with the out-of-limits deviation.

9. The sensor monitoring system of claim 3 wherein said visual map is formed on a two-dimensional color graphics monitor.

10. The sensor monitoring system of claim 4 wherein said visual map is formed on a two-dimensional color graphics monitor.

11. The sensor monitoring system system of claim 1 wherein said interpolation means comprises means for performing a surface splines interpolation.

12. The sensor monitoring system of claim 2 wherein said interpolation means comprises means for performing a surface splines interpolation.

13. The sensor monitoring system of claim 9 wherein the color classifications are chosen so that lower values of the parameter contain more blue and higher values of the parameter contain more red.

14. The sensor monitoring system of claim 10 wherein the color classifications are chosen so that lower values of the deviation contain more blue and higher values of the deviation contain more red.

15. The sensor monitoring system of claim 1 wherein the reference values are periodically updated.

16. The sensor monitoring system of claim 1 wherein the reference values are periodically updated.

17. A method of monitoring the three dimensional power distribution in a core of a nuclear reactor in a manner to representatively reconstruct the three dimensional power distribution which comprises the steps of:
monitoring flux emanating from the core at positions exterior of the core;
monitoring the temperature of reactor coolant flowing into the core and the temperatures of the reactor coolant exiting the core assemblies;
generating fractional deviations of enthalpy rise from the temperatures;
determining the three dimensional core power distribution in response to the flux measurements;
adjusting the three dimensional power distribution in light of the deviations; and
multidimensionally presenting the adjusted three dimensional core power distribution.

18. The method of claim 17 wherein the step of presenting comprises displaying the adjusted three dimensional core power distribution.

19. The method of claim 17 wherein the step of presenting comprises storing the adjusted three dimensional core power distribution.

20. The method of claim 17 wherein the step of presenting comprises presenting the adjusted three dimensional core power distribution to means for determining and presenting the burnup distribution in the core.

21. The method of claim 20 wherein presenting the burnup distribution comprises displaying the burnup distribution.

22. The method of claim 18 wherein the step of displaying comprises displaying two dimensional representations of deviations of the adjusted three dimensional core power distribution from predetermined reference values, the two dimensional representations correspond to planes in the reactor core which are perpendicular to a given axis of the reactor core.

23. The method of claim 22 wherein the step of displaying further comprises:
classifying the deviations into a number of different classes; and
displaying the class of deviations in color modulated form according to the class of the deviation.

24. The method of claim 23 wherein the color classifications are chosen so that lower values of the deviation contain more red.

25. A sensor monitoring system for displaying a profile of power over a defined area comprising at least a part of a core of a nuclear reactor, which system comprises:
a core inlet temperature sensor;
a plurality of core-exit thermocouples positioned to monitor at least a portion of the defined area;
means, responsive to the outputs from said thermocouples and said core inlet temperature sensor, for generating corresponding representative fractional deviation values of relative enthalpy rise from reference values;
means for interpolating the generated values of relative enthalpy rise to provide an output representative of interpolated values of fractional deviations in enthalpy rise in the defined area;
a plurality of neutron sensors for monitoring core flux;
means for modifying the generated values and the interpolated values in dependence on the core flux to produce power values;
means for classifying the power values into a number of different classes; and
means for multidimensionally displaying the classes of the power values in a visual map designed to correspond to the defined area, said map having subdivisions corresponding to portions of the defined area and said subdivisions being color modulated according to the class of the power value corresponding thereto, the color classifications being chosen so that lower values of power are more blue and higher values of power contain more red, whereby a relative color variable profile of power is displayed over the defined area.

26. The sensor monitoring system of claim 1, further comprising:
a plurality of neutron sensors for monitoring flux in the core; and
means for combining the generated values and the interpolated values of the fractional deviation in enthalpy rise with the flux outputs of said neutron sensors and producing power values, said classifying means classifying the power values and said display means displaying the classes of the power values.

27. The sensor monitoring system of claim 2, further comprising:
  a plurality of neutron sensors for monitoring flux in the core; and
  means for combining the deviations with the flux outputs of said neutron sensors and producing power deviations, said classifying means classifying the power deviations and said display means displaying the classes of the power deviations.

28. The sensors monitoring system of claim 27, wherein said combining means adjusts a reference three-dimensional core power distribution and produces three-dimensional power values.

29. The sensor monitoring system of claim 28, wherein said dispaly means displays the three-dimensional power values.

30. A method of monitoring enthalpy rise in a core of a nucelar reactor, comprising the steps of:
  (a) monitoring core coolant inlet temperature;
  (b) monitoring core coolant exit temperatures of the coolant exiting core assemblies;
  (c) determining fractional deviations in enthalpy rise from the core coolant inlet temperature, the exit temperatures and reference values; and
  (d) multidimensionally displaying the deviations.

31. A sensor monitoring system for displaying a profile of fractional deviations in relative coolant enthalpy rise over a defined area comprising at least a part of a core of a nucelar reactor, which system comprises:
  a plurality of core exit coolant temperature sensors positioned to monitor at least a portion of the defined area;
  an inlet temperature sensor outside the core which monitors the temperature of core coolant at an inlet to the reactor;
  means, responsive to the outputs from both said core exit temperature sensors and said inlet temperature sensor, for generating corresponding representative values of acutal coolant enthalpy rise and corresponding values of relative enthalpy rise at each location in the defined area at which a core exit coolant temperature sensor is available;
  means, responsive to the generated values of relative enthalpy rise and to reference values of relative enthalpy rise at corresponding locations in the defined area, for generating values fo the fractional deviation of the measured values of relative enthalpy rise from the corresponding reference values;
  means for interpolating the generated values of fractional deviation in relative enthalpy rise to provide interpolated values of fractional deviation in relative enthalpy rise at locations in the defined area of the core other than those at which core exit coolant temperature sensors are available; and
  means for multidimensionally displaying the generated and interpolated values.

32. The sensor monitoring system of claim 31, further comprising:
  means for classifying the generated values and the interpolated values of fractional deviation in relative enthalpy rise into a number of different classes; and
  means for displaying the classes of generated and interpolated values to present the fractional deviation relative enthalpy rise in profile over the defined area.

33. A sensor monitoring system for displaying a profile of power over a defined area comprising at least a part of a core of a nuclear reactor, which system comprises:
  a plurality of neutron sensors for monitoring neutron flux emanating from the reactor core;
  means for determining a first estimate of core three-dimensional power distribution by adjusting a reference three-dimensional core power distribution such that an axial component of the power distribution conforms both in shape and in amplitude to the axial power distribution constructed from the flux;
  an core inlet temperature sensor;
  a plurality of core exit temperature sensors positioned to monitor at least a portion of the defined areea;
  means, responsive to the outputs of said core exit temperature sensors and said core inlet temperature sensor, for generating corresponding representative values of relative enthalpy rise;
  means for generating corresponding values of fractional deviations of the generated relative enthalpy rise values from coresponding reference relative enthalpy rise values;
  means for interpolating among the generated values of fractional deviation in relative enthalpy rise to provide interpolated values of fractional deviation in relative enthalpy rise at locations in the defined area that are not directly monitored by core exit temperature sensors;
  means for adjusting the first estimate of core three-dimensional core power distribution such that the radial component of power distribution incorporates the generated and interpolated values of fractional deviation in relative enthalpy rise; and
  means for multidimensionally displaying the adjusted first estimate.

34. The sensor monitoring system of claim 33, further comprising:
  means for classifying the power values into a number of different classes; and
  means for multidimensionally displaying the classes of power vlaues in a visual map corresponding to the defined area, said map having subdivisions being color modulated according to the class of the power value corresponding thereto, the color classifications being chosen so that lower values of power are more blue and higher values of power contain more red, and a relative color vairable profile of power is displayed over the defined area.

* * * * *